United States Patent [19]

Giannella et al.

[11] 4,412,428
[45] Nov. 1, 1983

[54] APPARATUS FOR PRODUCING AND DISPENSING AN AERATED FROZEN CONFECTION

[75] Inventors: Frank Giannella, Hawthorne; Enzo E. Pellicciari, Cliffside Park, both of N.J.

[73] Assignee: Coldelite Corporation of America, Lodi, N.J.

[21] Appl. No.: 269,998

[22] Filed: Jun. 3, 1981

[51] Int. Cl.³ .............................................. A23G 9/20
[52] U.S. Cl. ...................................... 62/308; 62/342; 366/150; 417/503; 417/550
[58] Field of Search ........................ 62/308, 342, 343; 417/550–554, 545, 503; 366/150, 154

[56] References Cited

U.S. PATENT DOCUMENTS

| | | | |
|---|---|---|---|
| 2,250,419 | 7/1941 | Johnston et al. | 417/550 X |
| 2,262,128 | 11/1941 | Zehner | 417/550 X |
| 2,344,787 | 3/1944 | Patterson et al. | 417/503 |
| 2,675,759 | 4/1954 | Yarger | 417/554 X |
| 3,317,198 | 5/1967 | Phelan et al. | 62/342 X |
| 3,827,339 | 8/1974 | Rosen et al. | 417/554 X |
| 4,344,744 | 8/1982 | Schuster et al. | 417/550 |

Primary Examiner—William E. Tapolcai
Attorney, Agent, or Firm—Samuelson & Jacob

[57] ABSTRACT

An apparatus for producing and dispensing an aerated frozen confection in which a pump is mounted in the liquid ingredients reservoir of the apparatus and operates to pump a mixture of air and liquid ingredients, in selected proportions, to the freezer compartment of the apparatus. The pump itself is responsive to pressure within the freezer compartment to regulate the volume of mixture supplied to the freezer compartment by the pump for enabling automatic replenishment of the aerated mix in the freezer compartment. The pump includes a plunger projecting into the freezer compartment and driven by a cam which rotates with an agitator in the freezer compartment to move the plunger against the bias of a spring in the pump so as to reciprocate the plunger until the pressure within the compartment is great enough to move the plunger away from the cam, against the bias of the spring, thereby discontinuing the supply of mix to the freezer compartment.

17 Claims, 12 Drawing Figures

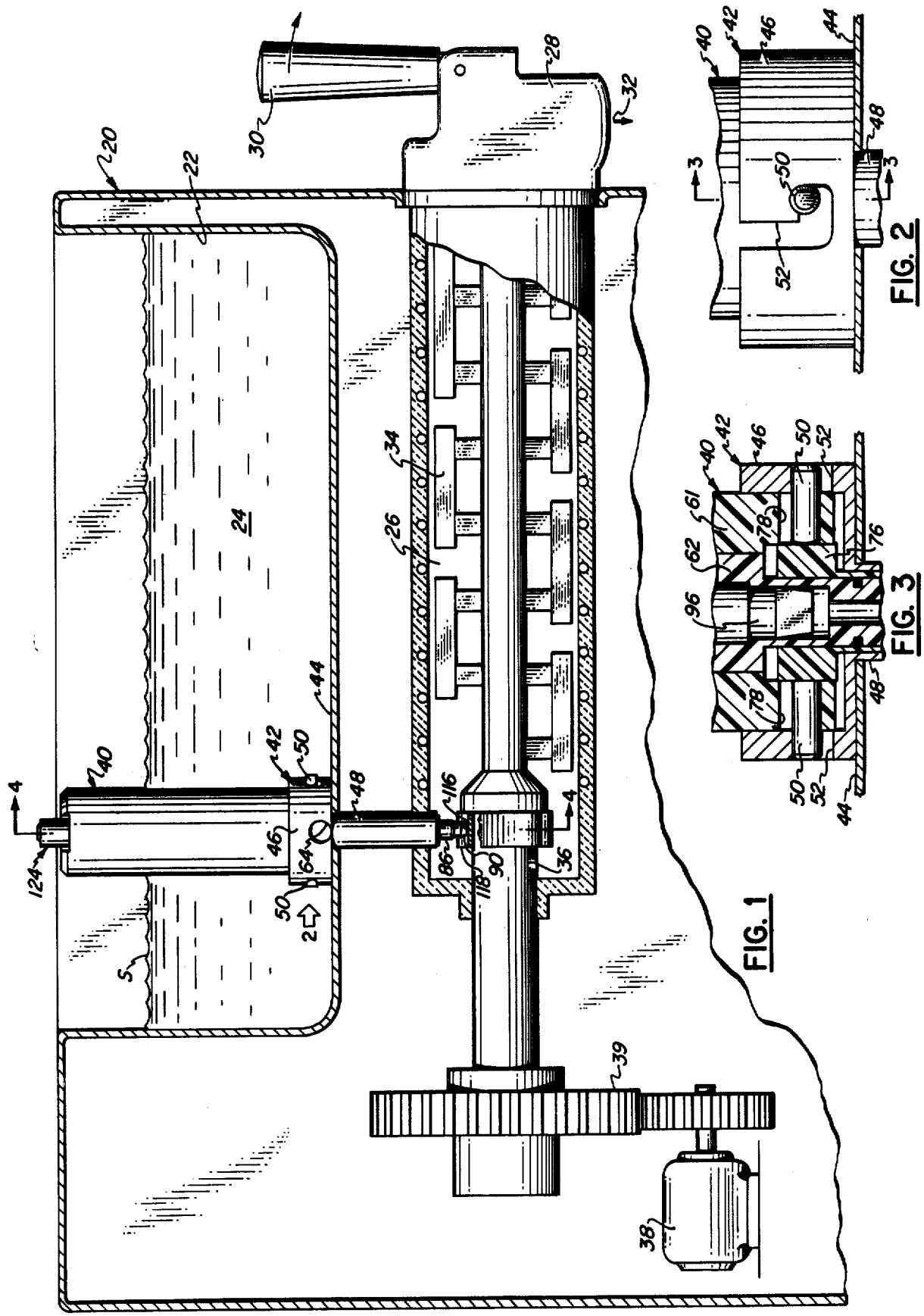

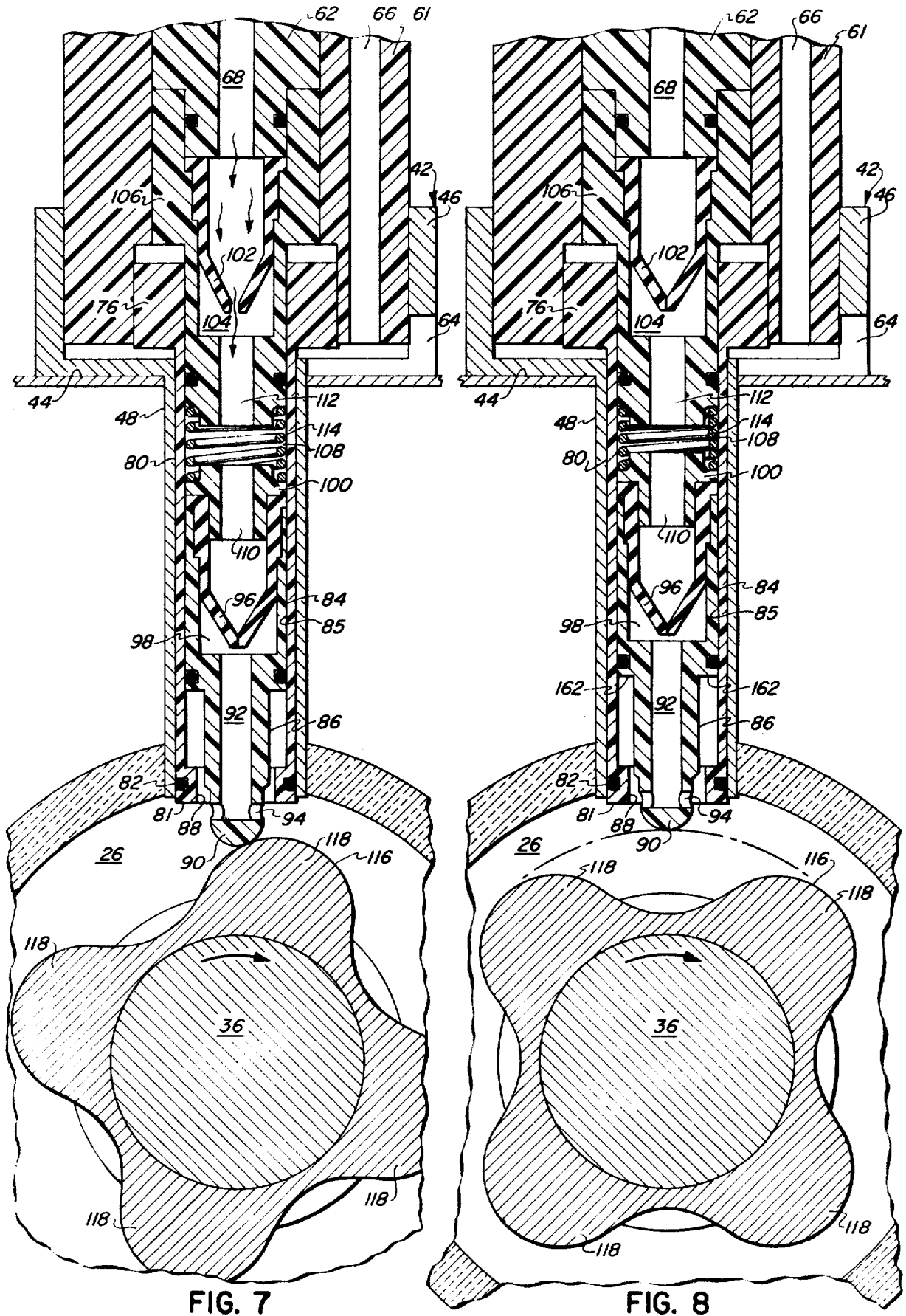

APPARATUS FOR PRODUCING AND DISPENSING AN AERATED FROZEN CONFECTION

The present invention relates generally to apparatus for making and serving aerated frozen confections and pertains, more specifically, to apparatus in which liquid ingredients and air are mixed in selected proportions and in which the mix is frozen and dispensed for consumption.

Aerated frozen confections are becoming more popular and are being produced and dispensed in increasing quantities. Among these products are the ubiquitous soft ice creams, shakes, sherbets and the more recently-developed frozen yogurts. Such products generally require the mixing of liquid ingredients with a prescribed volume of air and the subsequent freezing of the resulting mixture prior to dispensing the finished product for consumption. The desirability of the finished product is directly related to the accuracy with which the volume of air is controlled and the way in which the air is metered and blended with the liquid ingredients.

Apparatus for producing and dispensing frozen confections is available currently in which air is mixed with liquid ingredients, in measured proportions, and the aerated mixture is frozen and then dispensed for consumption. For the most part, such present machines use gear-type pumps to pump the liquid ingredients into a freezing compartment of the apparatus while at the same time blending air with the liquid ingredients to aerate the mixture to be frozen; however, other types of pumps, such as two-stroke piston pumps as well as others, have been proposed. Gear pumps have operated satisfactorily, but have exhibited some undesirable characteristics. Initially, such pumps are expensive to manufacture, they tend to wear relatively quickly, requiring more frequent repair and replacement, and they usually require relatively complex disassembly for cleaning. In addition to exhibiting the above undesirable characteristics, some of the other types of pumps have been found to require an exceptional degree of care during cleaning to assure that harmful bacteria cannot accumulate in the various passages of the pumps. Further, all of the above enumerated known pumps often require that the machines incorporate an exceptional number of additional component parts for driving, controlling and operating the pumps.

It is an object of the present invention to provide improved apparatus for producing and dispensing an aerated frozen confection, which apparatus is much more simple in construction, use and maintenance than currently available apparatus.

Another object of the invention is to provide apparatus of the type described above and which employs a pump for pumping liquid ingredients and mixing the liquid ingredients with a metered amount of air to supply an aerated mixture to the freezer compartment of the apparatus, the pump having a simplified construction employing fewer parts and reduced complexity.

Still another object of the invention is to provide an apparatus of the type described above and which enables ease in selecting particular proportions between liquid ingredients and air in the aerated mixture which is to be frozen, and which is effective in maintaining close control over the selected proportions.

Another object of the invention is to provide apparatus of the type described above and which enables improved blending of accurately proportioned air and liquid ingredients so as to produce and dispense a highly desirable product of consistent quality.

Yet another object of the invention is to provide apparatus of the type described and in which the construction enables ease of use and maintenance and, in particular, simplifies the periodic cleaning which is essential in the regular use of the apparatus.

A further object of the invention is to provide apparatus of the type described and in which intermittent operation of the pump in order to replenish the supply of aerated mix in the freezer compartment of the apparatus is enabled with decreased complexity and increased efficiency.

A still further object of the invention is to provide apparatus of the type described and which will produce and dispense an aerated frozen confection of improved and consistent quality with increased economy.

Another object of the invention is to provide apparatus of the type described and which is suitable for producing and dispensing aerated frozen confections which incorporate fine particles such as pureed fruit with the liquid ingredients.

The above objects, as well as still further objects and advantages, are accomplished by the present invention, which may be described briefly as providing an improvement in an apparatus for producing and dispensing an aerated frozen confection, the apparatus having a reservoir for holding a supply of liquid ingredients to be frozen, a pump assembly for pumping the liquid ingredients from the reservoir and air to be mixed with the liquid ingredients, a freezer compartment for receiving the mixture of liquid ingredients and air from the pump assembly and freezing the mixture, a dispenser communicating with the freezer compartment for selectively dispensing the aerated frozen confection by means of pressure within the freezer compartment, and an agitator within the freezer compartment for agitating the mixture within the freezer compartment, the pump assembly comprising: a pump housing; a conduit within the housing, the conduit having an inlet end communicating with the reservoir; an outlet end communicating with the freezer compartment, and a pump cavity within the conduit intermediate the inlet end and the outlet end; a pumping member mounted for longitudinal reciprocation within the pump cavity through a suction stroke and a feed stroke, the pumping member having an internal passage extending generally longitudinally, essentially parallel to the direction of reciprocation of the pumping member and along a path of flow of mixture from the pump cavity to the outlet end of the conduit; a first check valve placed in the path of flow, and a second check valve placed within the conduit between the inlet end of the conduit and the first check valve such that mixture will be drawn through the second check valve into the pumping cavity during the suction stroke of the pumping member and then will pass through the first check valve to be discharged at the outlet end during the feed stroke of the pumping member; air metering means in the pump housing and communicating with the conduit and the second check valve for passing a metered amount of air into the conduit in response to movement of the pumping member during the suction stroke; and pressure regulating means in the pump housing for limiting the pressure within the freezing compartment to a predetermined maximum pressure.

The invention will be understood more fully, while still further objects and advantages will become apparent, in the following detailed description of preferred embodiments illustrated in the accompanying drawing, in which:

FIG. 1 is a partially diagrammatic longitudinal cross-sectional view of an apparatus constructed in accordance with the invention;

FIG. 2 is an enlarged fragmentary elevational view taken in the direction of arrow 2 in FIG. 1;

FIG. 3 is a fragmentary cross-sectional view taken along line 3—3 of FIG. 2;

FIGS. 5 through 8 are fragmentary views of a portion of FIG. 4, but with the component parts in different operating positions;

Figure 4:
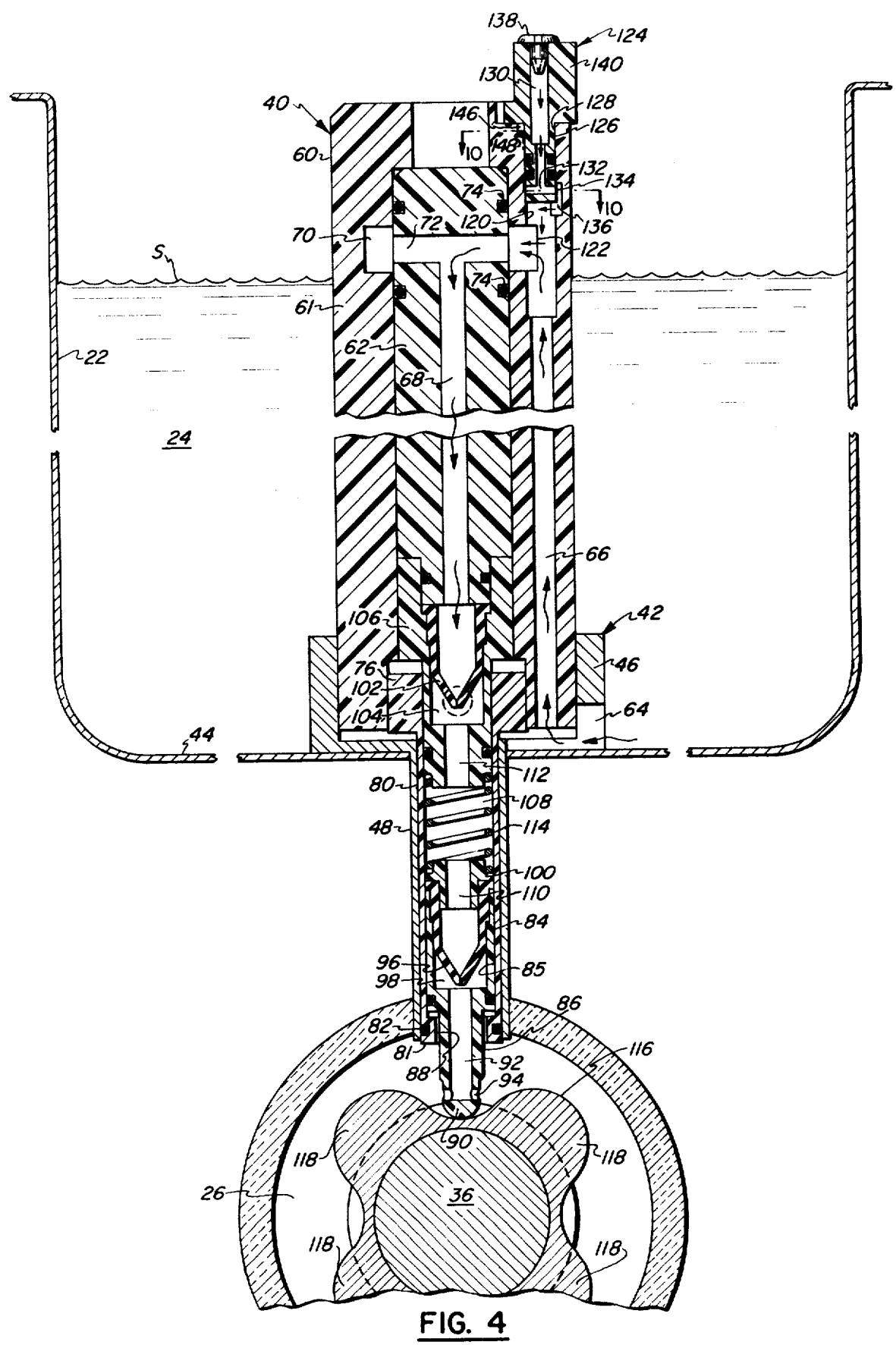
FIG. 4 is an enlarged cross-sectional view taken along line 4—4 of FIG. 1.

Referring now to the drawing, and especially to FIG. 1 thereof, an apparatus for producing and dispensing an aerated frozen confection, such as soft ice cream, is shown somewhat diagrammatically at 20. Apparatus 20 includes a reservoir 22 within which there is placed a supply of liquid ingredients 24 which are to be aerated and delivered to a freezer compartment 26 of the apparatus for freezing and subsequent selective dispensing at a dispenser head 28. Dispenser head 28 is of known construction and has a dispensing handle 30 which is operated by pivoting the handle 30 in the direction shown to deliver a finished product at 32 for consumption. An agitator 34 is mounted for rotation within the freezer compartment 24 and is rotated by a drive shaft 36 driven by a motor 38 through a drive train 39.

The liquid ingredients 24 in reservoir 22 are aerated and delivered to the freezer compartment 26 by a pump assembly 40. A fitting 42 is affixed to the bottom 44 of reservoir 22 and includes a collar 46 with an integral depending tube 48. Collar 46 secures the pump assembly 40 within apparatus 20 and tube 48 extends between reservoir 22 and freezer compartment 26, to provide an opening therebetween and to enable pump assembly 40 to perform its designated function, all as will be explained in greater detail below. As best seen in FIGS. 2 and 3, as well as in FIG. 1, pump assembly 40 is secured within apparatus 20 by means of a quick-release mechanism shown in the form of a bayonet-type connection which includes a pair of oppositely projecting pins 50 on the pump assembly 40 extending into a complementary pair of slots 52 in collar 46.

Turning now to FIG. 4, pump assembly 40 has an outer housing 60 which includes an upper housing member 61 within which there is placed a transfer tube 62. An inlet opening 64 in collar 46 is located adjacent the bottom 44 of reservoir 22 and communicates with a vertical inlet passage 66 in upper housing member 61, vertical inlet passage 66, in turn, communicating with a central passage 68 in transfer tube 62, via an annular channel 70 in upper housing member 61 and a lateral passage 72 in transfer tube 62. Seals 74 assure a liquid-tight connection between passages 66 and 68.

Outer housing 60 further includes a lower housing member 76 which is affixed to upper housing member 61 by means of pins 50 (see FIG. 3) which are anchored in lower housing member 76 and extend through corresponding slots 78 in upper housing member 61, in a further bayonet-type connection which secures the lower housing member 76 to the upper housing member 61. Lower housing member 76 includes a sleeve portion 80 which extends downwardly within tube 48 of fitting 42 and terminates at a lower end 81 within the freezer compartment 26. A seal 82 is provided adjacent the lower end 81 to close any communication between the reservoir 22 and the freezer compartment 26 along the engaged complementary surfaces of the tube 48 and the sleeve portion 80 of lower housing member 76.

A pumping member 84 is mounted for reciprocating movement upwardly and downwardly within a pump cavity 85 provided by the sleeve portion 80 of lower housing member 76 and includes a depending plunger 86 which extends downwardly through an aperture 88 in the lower end 81 of sleeve portion 80. Plunger 86 includes a follower 90 at the lowermost or distal end of the plunger and an axially-extending passage 92 which communicates with the freezer compartment 26 through laterally-extending outlet openings 94.

A lower or first check valve 96 is carried by the pumping member 84 and is seen to be in the form of an elastomeric pinch valve, commonly referred to as a "duckbill", which is received within a lower valve chamber 98 and retained in place within the pumping member 84 by a retaining ring 100. An upper or second check valve 102 is placed in an upper valve chamber 104 located in a retaining sleeve 106 fitted onto the transfer tube 62 and has a construction similar to lower check valve 96. A pump chamber 108 is located between the lower valve chamber 98 and the upper valve chamber 104 and is in communication with each valve chamber via a lower passage 110 in retaining ring 100 and an upper passage 112 in retaining sleeve 106. Thus, the passages 66, 68, 92, 110 and 112, together with chambers 98, 104 and 108, establish a conduit between the inlet opening 64 at the reservoir 22 and the outlet openings 94 at the freezer compartment 26. The conduit is of sufficient size and unrestricted configuration, and the check valves 96 and 102 are so constructed as to enable the passing of fine particles, such as pureed fruit, together with the liquid ingredients, without disturbing the effective operation of the apparatus.

Figures 5, 6:
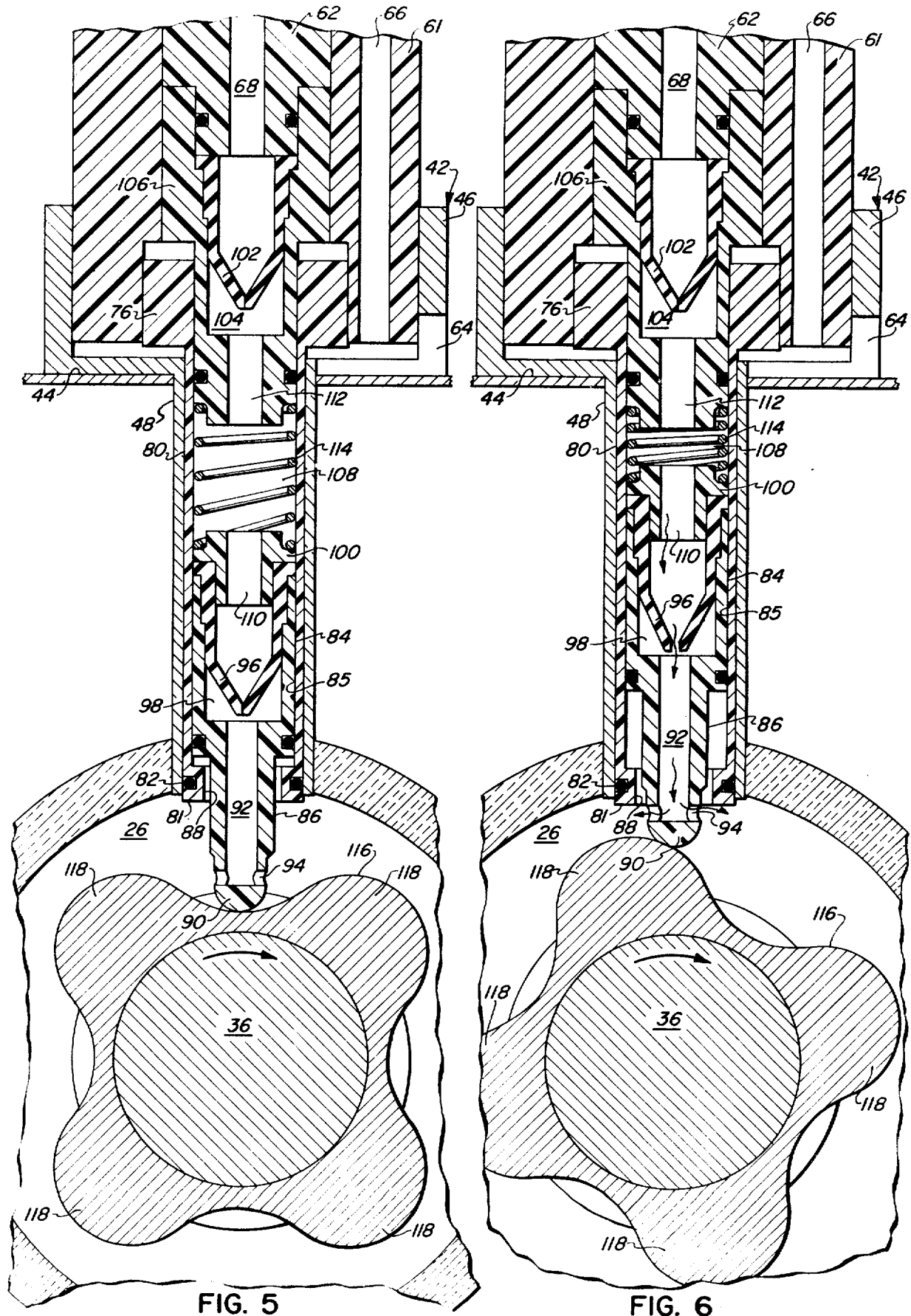

A helical spring 114 is placed between the retaining ring 100 and the retaining sleeve 106 and biases the pumping member 84 downwardly. Fitting 42 is located relative to drive shaft 36 (also see FIG. 1) so that the downward biasing force of spring 114 urges the follower 90 of plunger 86 against a cam 116 mounted for rotation with the drive shaft 36. Cam 116 has four lobes 118; however, the number of lobes may be varied. Turning now to FIGS. 5, 6 and 7, upon rotation of the drive shaft 36 and cam 116, pumping member 84 will be moved from a lower position, shown in FIG. 5, upwardly, as shown in FIG. 6. During such upward movement, the volume of pump chamber 108 will be contracted and the contents of the pump chamber 108 will be discharged through the lower check valve 96, passage 92 and outlet openings 94 to the freezer compartment 26. Continued rotation of cam 116 will drive the pumping member 84 to an uppermost position to complete the upward movement, or feed stroke of the pumping member. Further rotation of cam 116 will enable spring 114 to move the pumping member 84 downwardly, as seen in FIG. 6, toward the lowermost position. During such downward movement, the volume of pump chamber 108 will be expanded and materials will be drawn into the pump chamber 108 through the upper check valve 102. Continued rotation of cam 116 will enable spring 114 to return the pumping member 84 to the lowermost position to complete the downward movement, or suction stroke of the pumping member.

Continued reciprocation of pumping member 84 will draw liquid ingredients 24 from reservoir 22, through passages 66 and 68, to the pump chamber 108, thence along a path of flow to be discharged into the freezer compartment 26. During the suction stroke of the pumping member 84, air will be introduced into the liquid ingredients through air metering means which communicate with the conduit carrying the liquid ingredients from the reservoir to the freezer compartment. Thus, an air passage 120 communicates with vertical inlet passage 66 and annular channel 70 at 122 and a selectively adjustable metering valve assembly 124 admits a selected volume of air to be mixed with the liquid ingredients 24 as the liquid ingredients are pumped along the conduit provided by passages 66 and 68.

Figure 9:
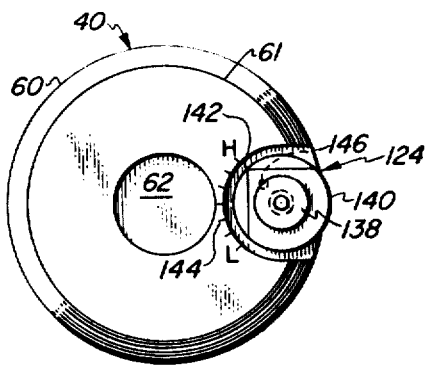
FIG. 9 is a top plan view of the pump assembly of the apparatus.
Figure 10:
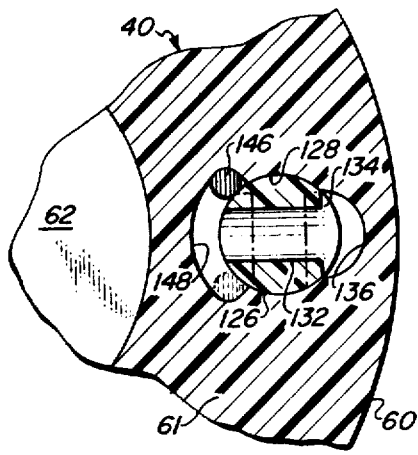
FIG. 10 is an enlarged cross-sectional view taken along line 1—1 of FIG. 4.

As best seen in FIGS. 4, 9 and 10, air metering valve assembly 124 includes a rotary valve member 126 seated within a complementary bore 128 in upper housing member 61 and having a longitudinal inlet air passage 130 communicating with a lateral outlet passage 132. Lateral outlet passage 132 has an outlet opening 135 which ordinarily is registered with a recess 136 in the upper housing member 61 so that air can pass from inlet air passage 130 to air passage 120 for mixing with the liquid ingredients. Thus, during each suction stroke of pumping member 84, ambient air will be drawn into inlet air passage 130, through an inlet air check valve 138, and will be mixed with the liquid ingredients 24 being drawn through passages 66 and 68. Inlet air check valve 138 preferably is constructed of an elastomer and has a configuration and operation similar to lower and upper check valves 96 and 104.

In order to select the appropriate amount of air to be drawn into the liquid ingredients, in accordance with the desired proportions of air and liquid ingredients, rotary valve member 126 is provided with a knob 140 which enables manual rotation of the rotary valve member 126 between a fully open position, shown in full lines in FIG. 10, and a fully closed position, shown in phantom in FIG. 10. When the rotary valve member 126 is in the fully open position, outlet opening 134 is fully registered with recess 136 and the maximum volume of air is permitted to flow through air passages 130 and 132. When the rotary valve member 126 is in the fully closed position, no air will flow. Placement of the rotary valve member 126 at any angular position between the fully open and fully closed positions provides for infinite variation of the amounts of air between the two end limits. Knob 140 is provided with a pointer 142 and the end positions are marked "H" for the fully open position and "L" for the fully closed position, with a scale 144 between the end markings, so that desired settings can be repeated at will. A pin 146 projects downwardly from knob 140 into a corresponding groove 148 in the upper housing member 61, the circumferential extent of the groove 148 defining the limits of rotational travel of the pin 146, and hence of the knob 140.

Since the pump assembly outer housing 60 always extends above the level S of the liquid ingredients 24 in the reservoir 22, and the air inlet to the air metering valve assembly 124 is located at the uppermost end of the pump assembly outer housing 60, ambient air always will be available to the air metering valve assembly 124. In addition, the placement of the knob 140 enables ease of access and viewing for accurate setting of the air metering valve assembly. The arrangement of component parts in the air metering valve assembly itself assures accuracy in the choice of a particular amount of air to be introduced into the aerated mixture and provides easily repeatable settings for consistency of results, all leading to the production of an end product with closely controlled quality.

The arrangement of the pumping member 84, the pump chamber 108 and the check valves 96 and 102, provides enhanced blending of the air and the liquid ingredients as the mixture is being moved along the conduit between the reservoir 22 and the freezer compartment 26, thereby providing a more consistent, high quality product.

Figure 11:
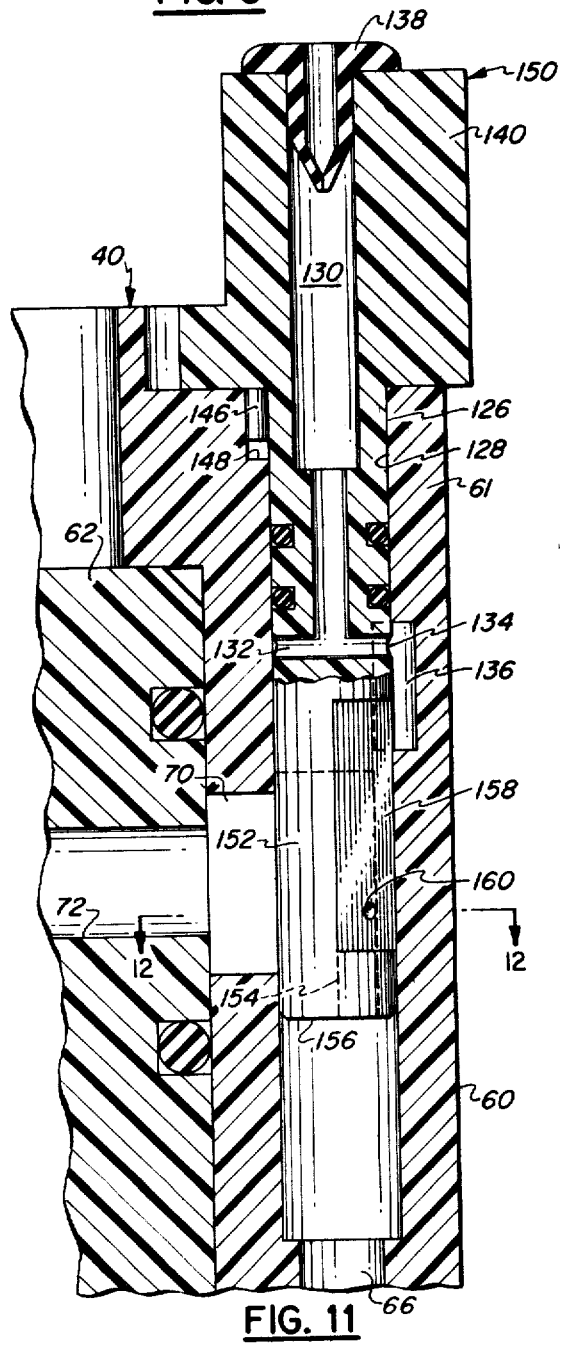
FIG. 11 is an enlarged fragmentary cross-sectional view of an alternate construction.
Figure 12:
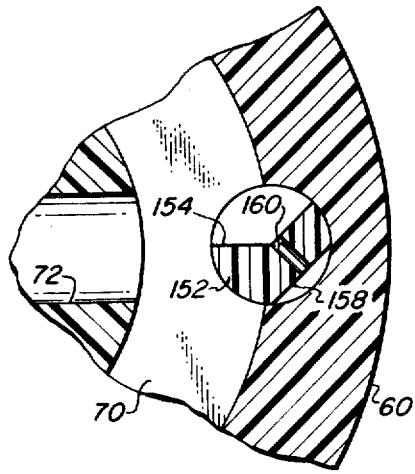
FIG. 12 is a cross-sectional view taken along line 12—12 of FIG. 11.

Referring now to FIGS. 11 and 12, an alternate metering valve assembly is shown at 150. In addition to controlling the volume of air entering the conduit between the reservoir and the freezer compartment, metering valve assembly 150 further controls the volume of liquid ingredients drawn through the metering valve assembly so that the proportion of air and liquid ingredients is more fully controlled. As in the earlier-described embodiment, metering valve assembly 150 includes rotary valve member 126 seated within complementary bore 128 in upper housing member 61 and having longitudinal inlet air passage 130 communicating with lateral outlet passage 132. Outlet opening 134 is registered with recess 136, and check valve 138 admits ambient air to the inlet air passage 130 in accordance with the setting of knob 140. In this instance, however, rotary valve member 126 is provided with a selectively adjustable liquid metering valve in the form of an axial extension 152 which extends downwardly beyond the annular channel 70, and the axial extension 152 includes a notch 154 which extends upwardly from the lower end 156 of axial extension 152 to communicate with the annular channel 70. The angular extent of notch 154 is limited so that the angular position of the rotary valve member 126 will determine the volume of liquid ingredients which can pass from passage 66 to channel 70 and to passages 72 and 68. Air admitted to recess 136 is passed to channel 70 through a bypass 158 along axial extension 152 and an air hole 160 passing through axial extension 152. In this manner, rotation of the rotary valve member 126 from the "H" position toward the "L" position will reduce the volume of air admitted to channel 70, as before, while the volume of liquid ingredients will be increased. Rotation from the "L" position toward the "H" position will decrease the volume of liquid ingredients transferred to channel 70 while increasing the volume of air. Thus, a wider latitude in the proportions of air and liquid ingredients is afforded.

Returning now to FIG. 8, the arrangement of the pumping member 84 and the biasing spring 114 provides the pump assembly 40 with a self-regulating feature. Thus, as the pressure in the freezer compartment 26 builds up as a result of filling the freezer compartment with the aerated mixture, the pressure in the freezer compartment will bear against the pumping member 84, and, in particular, against the lower surfaces 162 of the pumping member 84. The lower surfaces 162 are so located and oriented that exposure to such pressure will tend to move the pumping member 84 upwardly against the biasing force of spring 114. By choosing the appropriate spring rate for spring 114, the pumping member 84 will be permitted to rise in response to the pressure in the freezer compartment until, at a predetermined maximum pressure, the plunger 86 will be displaced upwardly away from the cam 116, as seen in FIG. 8, so that pumping will be discontinued until the pressure within the freezer compartment drops below the predetermined maximum pressure.

Pump assembly 40 may be removed from apparatus 20 with ease. All that is necessary is a short turn of the housing 60 to release the quick-release mechanism provided by the bayonet-type connection between the housing 60 and collar 46. The housing 60 is then withdrawn vertically upwardly, with the lower housing member 76 sliding upwardly out of the tube 48. The pump assembly is then disassembled with ease, all of the component parts being withdrawn axially relative to one another once the bayonet-type connection between the upper housing member 61 and the lower housing member 76 is disconnected. All of the component parts are then fully exposed for effective cleaning. The various passages are fully accessible so that harmful bacteria cannot collect in hidden or blind passages.

The simplified construction of pump assembly 40 enables economy of manufacture and maintenance, together with reliable operation. Most of the component parts are fabricated readily of food grade synthetic resin materials which are economical and easy to clean and which will provide efficient operation over an extended service life.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. In an apparatus for producing and dispensing an aerated frozen confection, the apparatus having a reservoir for holding a supply of liquid ingredients to be frozen, a pump assembly for pumping the liquid ingredients from the reservoir and air to be mixed with the liquid ingredients, a freezer compartment for receiving the mixture of liquid ingredients and air from the pump assembly and freezing the mixture, a dispenser communicating with the freezer compartment for selectively dispensing the aerated frozen confection by means of pressure within the freezer compartment, and an agitator within the freezer compartment for agitating the mixture within the freezer compartment, the improvement in which the pump assembly comprises:

a pump housing;
a conduit within the pump housing, the conduit having an inlet end communicating with the reservoir, an outlet end communicating with the freezer compartment, and a pump cavity within the conduit intermediate the inlet end and the outlet end;
a pumping member mounted for longitudinal reciprocation within the pump cavity through a suction stroke and a feed stroke, the pumping member having an internal passage extending generally longitudinally, essentially parallel to the direction of reciprocation of the pumping member and along a path of flow of mixture from the pump cavity to the outlet end of the conduit;
a first check valve placed in the path of flow, and a second check valve placed within the conduit, between the inlet end of the conduit and the first check valve, such that mixture will be drawn through the second check valve into the pumping cavity during the suction stroke of the pumping member and then will pass through the first check valve to be discharged at the outlet end during the feed stroke of the pumping member;
air metering means in the pump housing and communicating with the conduit between the inlet end of the conduit and the second check valve for passing a metered amount of air into the conduit in response to movement of the pumping member during the suction stroke; and
pressure regulating means in the pump housing for limiting the pressure within the freezing compartment to a predetermined maximum pressure.

2. The invention of claim 1 wherein:
the pump housing includes a generally tubular housing member extending between the reservoir and the freezer compartment;
the pumping member is generally tubular and is mounted for reciprocation within the tubular housing member; and
the first check valve is affixed to the pumping member, within the internal passage thereof, for reciprocation therewith.

3. The invention of claim 2 wherein:
the pumping member includes a plunger extending longitudinally into the freezer compartment and having a distal end located in the freezer compartment; and
the outlet end of the conduit is located adjacent the distal end of the plunger.

4. The invention of claim 3 including:
drive means extending into the freezer compartment for driving the agitator; and
coupling means coupling the plunger with the drive means, within the freezer compartment, for reciprocating movement of the plunger in response to operation of the drive means.

5. The invention of claim 4 wherein:
the drive means includes a drive shaft extending into the freezer compartment and mounted for rotation therein so as to rotate the agitator; and
the coupling means includes a cam mounted for rotation with the drive shaft, within the freezer compartment, a follower at the distal end of the plunger, and resilient biasing means biasing the plunger toward the cam.

6. The invention of claim 5 wherein:
the resilient biasing means enables withdrawal of the plunger away from the cam against the bias of the resilient biasing means a sufficient distance to uncouple the plunger from the cam and discontinue reciprocation of the pumping member; and
the pressure regulating means includes a surface on the pumping member exposed to the pressure within the freezer compartment and oriented so as to enable said withdrawal of the plunger in response to the presence of said predetermined maximum pressure in the freezer compartment.

7. The invention of claim 6 wherein the resilient biasing means includes a spring located within the pump chamber and biasing the pumping member toward the cam.

8. The invention of claim 1 wherein the liquid ingredients do not exceed a given level within the reservoir and the pump housing extends longitudinally from beneath that level to above the given level, the inlet end of the conduit being located below the given level and the air metering means including an air inlet located above the given level.

9. The invention of claim 8 wherein the air metering means includes a selectively adjustable air metering valve for regulating the volume of air admitted to the conduit, during the suction stroke of the pumping member, relative to the amount of liquid ingredients drawn from the reservoir.

10. The invention of claim 9 wherein the air metering means includes a selectively adjustable liquid metering valve for regulating the volume of liquid admitted to the conduit, during the suction stroke of the pumping member, relative to the amount of air drawn into the conduit.

11. The invention of claim 1 including securing means on the pump housing for mounting the pump housing within the reservoir for selective removal therefrom.

12. The invention of claim 11 wherein the securing means includes a quick-release mechanism.

13. In an apparatus for producing and dispensing an aerated frozen confection, the apparatus having a reservoir for holding a supply of liquid ingredients to be frozen, a pump assembly for pumping the liquid ingredients from the reservoir and air to be mixed with the liquid ingredients, a freezer compartment for receiving the mixture of liquid ingredients and air from the pump assembly and freezing the mixture, a dispenser communicating with the freezer compartment for selectively dispensing the aerated frozen confection by means of pressure within the freezer compartment, and an agitator in the freezer compartment for agitating the mixture within the freezer compartment, the improvement comprising:
an opening between the reservoir and the freezer compartment;
securing means for securing the pump assembly within the reservoir with at least a portion of the pump assembly located in the opening;
agitator drive means for driving the agitator, said agitator drive means including a drive shaft extending into the freezer compartment;
pump drive means for driving the pump assembly, said pump drive means including a drive element extending into the freezer compartment; and
coupling means coupling the drive element with the drive shaft such that the pump assembly will pump said mixture in response to actuation of the drive shaft.

14. The invention of claim 13 wherein:
the drive shaft is mounted for rotation within the freezer compartment;
the pump drive means includes a plunger in the pump assembly and mounted for reciprocating movement, the plunger extending through said opening and into the freezer compartment; and
the coupling means includes a cam mounted upon the drive shaft for rotation with the drive shaft, and resilient biasing means biasing the plunger toward the cam so as to enable reciprocation of the plunger in response to rotation of the cam.

15. The invention of claim 14 wherein the securing means includes selectively releasable means enabling selective withdrawal of the pump assembly from the opening to release the pump assembly from the apparatus.

16. The invention of claim 15 wherein the selectively releasable means includes a quick-release mechanism.

17. The invention of claim 13, 14 or 16 including a conduit extending through the pump assembly for conducting the mixture to the freezer compartment, the conduit passing through said opening between the reservoir and the freezer compartment.

* * * * *